UNITED STATES PATENT OFFICE.

HARRY D. QUINBY, OF DENVER, COLORADO, ASSIGNOR TO ROSALIE M. QUINBY, OF SAME PLACE.

ENAMELING SHEET METAL AND COMPOUND THEREFOR.

SPECIFICATION forming part of Letters Patent No. 519,968, dated May 15, 1894.

Application filed January 8, 1894. Serial No. 496,163. (No specimens.)

*To all whom it may concern:*

Be it known that I, HARRY D. QUINBY, a citizen of the United States, residing at Denver, in the county of Arapahoe and State of Colorado, have invented certain new and useful Improvements in Enameling Sheet Metal and Compounds Therefor; and I do hereby declare the following to be a full, clear, and exact description of the invention, such as will enable others skilled in the art to which it appertains to make and use the same.

The objects of my invention are: First—to make a translucent glass free from all coloring matter, and from as few ingredients as possible. Second—to use but one coat of enamel in coating metal or metal ware. Third—to use a peculiar pickling operation, by means of which the metal to be enameled is cleaned and the surface thereof is roughened, by the action of a very strong sulphuric acid solution, which immediately produces a violent chemical action thereon. Fourth—the addition of any desired mineral coloring matter, either in the process of grinding the glass, or in the process of dipping the metal; by means of which, said coloring matter, on subsequent burning in the muffle, produces a new chemical combination, thus obtaining many beautiful and ornamental varieties of enamel and by a much cheaper and simpler method than any heretofore practiced. Fifth—to discontinue the use of the customary large and expensive drying rooms for drying the metal or ware after being dipped, as is now the universal practice, and drying the coating on the metal or ware at the ordinary temperature of the atmosphere.

The composition of my glass is as follows, viz: silica, one hundred pounds; feldspar, one hundred pounds; borax, one hundred pounds; calcium fluoride, twenty pounds; calcium phosphate, sixteen pounds. These ingredients after being thoroughly mixed, are placed in a reverberatory or other suitable furnace, where they are fused or melted. After complete fusion, the mass is run into a tank of cold water, to granulate it, to facilitate grinding. The above proportions may be varied slightly, but I find that a glass made from the above mentioned formula, has a very high glaze in itself and is capable of withstanding acid tests. To every one hundred pounds of this glass, I add about six or seven pounds of white pipe clay, while the same is being ground with water, in an ordinary burr stone or porcelain mill, as this ingredient hardens the glass. This grinding is continued until all grit is removed and is complete when a small pinch of the glass is taken between the thumb and finger, and no grit or gritty particles are felt. After the grinding is completed, the mass is run into settling tubs and allowed to settle; the surplus water is carefully drawn off, and the mass is left about the consistency of paste.

The principal ingredients composing the glass, viz: silica, feldspar and borax, being common materials, can be easily obtained and at a minimum price, result in great cheapness and simplicity in the manufacture of the glass.

To make a perfect enameled ware by using only one coat of enamel, has long been sought for but not attained, as all enameled metal or ware as now made, so far as I am aware, has two or more coats, which increases the cost of production to a great extent.

In my process, only one coat is necessary, on account of the improved composition of the glass and the mode of applying it, and this also results in a much cheaper product.

The metal or metal ware to be enameled is first annealed to soften it, as it becomes hardened during the process of manufacture. It is then taken to the pickling vats, which contain a strong sulphuric acid solution, where it is left for a short time. This solution is so strong that it immediately attacks the surface of the metal and not only cleans it, but also by its solvent action, roughens the surface, so that the adhesion of the enamel thereto is increased to a marked degree. This roughening is due largely to the fact that the metal or ware is not homogeneous, the softer parts being attacked more readily by the acid, than the harder parts. I prefer to use a twenty-five to fifty per cent. solution, varying somewhat in its strength, in proportion to the quality of the metal. The metal or ware after being taken from the vats, is scoured, cleaned and allowed to dry, when it is ready to be dipped.

Making the glass free from all coloring matter, is greatly advantageous over the old methods, because so many costly glass furnaces are dispensed with; only one furnace being required for all the glass used in my process. The glass is also uniform in a marked degree and the same glass composition is melted in the same furnace, from day to day. This glass also allows of various shadings, according to the wishes of the manufacturer, a result not attained by any other method.

The metal or ware having been dried as already described, it is taken to the dipping room to be coated. The glass mixture having been brought to the proper consistency and the desired color after burning, having been selected, as previously determined upon, it is added to the mixture just before the dipping is begun, but I prefer to add the coloring matter, during the glass grinding process. Whichever way is adopted, the coloring matter, which is some one of the mineral salts, selected according to the color desired, is thoroughly incorporated in the glass mixture, which, on subsequent burning in the muffle, dissolves in the glass and in connection with the action produced by the pickling operation, produces an enameled surface that is unexcelled for beauty of finish and durability.

The dipping operation is performed by dipping or coating the metal with the liquid glass mixture and then shaking the metal or ware, so as to distribute a thin even coating of the liquid upon it, removing any superfluous drops or particles thereof, which may accumulate at the free edges of the metal or ware. The firing or burning is conducted in the ordinary muffle furnace, at a bright cherry heat, and in my process the ware is burned until all chemical action has ceased in the glaze, and which may be as long as seven minutes, according to the coloring ingredients used as some require longer time than others, while in the muffle, for complete chemical action to take place.

In all processes heretofore practiced in enameling metal or ware, large and expensive drying rooms have been necessary, while in my process, I dispense with the drying rooms and their costly apparatus; the coated metal or ware, unless the atmosphere is heavily charged with moisture, is allowed to dry in an ordinary room, and at the usual atmospheric temperature.

Having thus fully described my invention, what I claim as new, and desire to secure by Letters Patent, is—

1. That improvement in the art of enameling metal or metal ware, which consists in first cleaning and roughening the surface of the metal or ware by a strong acid solution, next allowing it to dry, then dipping or coating the same with a glaze composed of the ingredients and substantially in the proportions herein named; allowing it to dry at the usual temperature of the atmosphere and then burning or firing, substantially as set forth.

2. That improvement in the art of enameling metal or metal ware which consists in first cleaning and roughening the surface of the metal or ware by a strong acid solution, next allowing it to dry, then dipping or coating the same with a glaze composed of the ingredients and coloring matter substantially in the proportions named, allowing the metal to dry at the usual temperature of the atmosphere and then burning or firing substantially as set forth.

3. The compound for enameling metal or metal ware as herein described, consisting of silica, feldspar, borax, calcium fluoride, calcium phosphate and pipe clay in substantially the proportions as herein set forth.

4. The compound for enameling metal or metal ware as herein described, consisting of silica, feldspar, borax, calcium fluoride, calcium phosphate, pipe clay and mineral salts in substantially the proportions as herein set forth.

In testimony whereof I affix my signature in presence of two witnesses.

HARRY D. QUINBY.

Witnesses:
JESSIE D. QUINBY,
FRANK P. DOBSON.